United States Patent [19]

Sanchez

[11] 4,362,338
[45] Dec. 7, 1982

[54] SAFETY DEVICE TO ACTUATE RAILROAD CAR AIR BRAKE

[76] Inventor: Charles D. Sanchez, Manson, Iowa 50563

[21] Appl. No.: 233,676

[22] Filed: Feb. 12, 1981

[51] Int. Cl.³ .............................................. B60T 11/26
[52] U.S. Cl. ..................................... 303/86; 105/217
[58] Field of Search ................. 105/216, 217; 303/86, 303/81, 1, 2; 188/33, 34, 151 A, 153, 134, 62, 112 R, 142, 145; 293/5, 6; 213/1R; 238/4

[56] References Cited

U.S. PATENT DOCUMENTS

| | | | |
|---|---|---|---|
| 1,024,084 | 4/1912 | Kintner | 105/216 X |
| 1,700,385 | 1/1929 | Stern | 303/86 |
| 2,278,160 | 3/1942 | Beltman | 188/145 |
| 3,084,637 | 4/1963 | Kohout | 104/243 |
| 3,240,291 | 3/1966 | Bingham | 104/243 X |
| 3,881,672 | 5/1975 | Gittard | 105/217 |
| 4,269,288 | 5/1981 | Collins | 105/216 X |

Primary Examiner—Douglas C. Butler
Attorney, Agent, or Firm—Morton S. Adler

[57] ABSTRACT

A safety device for automatically actuating the air brake system for an entire train of railroad cars when any one or more of the cars becomes derailed includes a derail wheel on its own axle attached to the truck frame between the wheels both on the front and rear set of wheels which are nearest to the train line and normally, such derail wheel is spaced slightly above the rail but will engage the ground in a derailment causing it to rotate. A flexible cable is secured at one end to the axle of the derail wheel so as to be windable thereon when such wheel rotates and has its other end preferably connected to the nearest air hose coupling that is attached to a like coupling on an adjacent car. The winding up of the cable on the derail wheel assembly in a derailment acts to pull the air hose coupling loose from its coupling with the air hose on an adjacent car and the resulting breaking of the train line sets the brakes for all cars in the train. In a second embodiment, one end of the cable is detachably connected to an air valve placed in the air pipe of the train line whereby the winding of the cable opens the valve to break the train line and is then automatically disengaged from such valve to avoid damage thereto.

6 Claims, 7 Drawing Figures

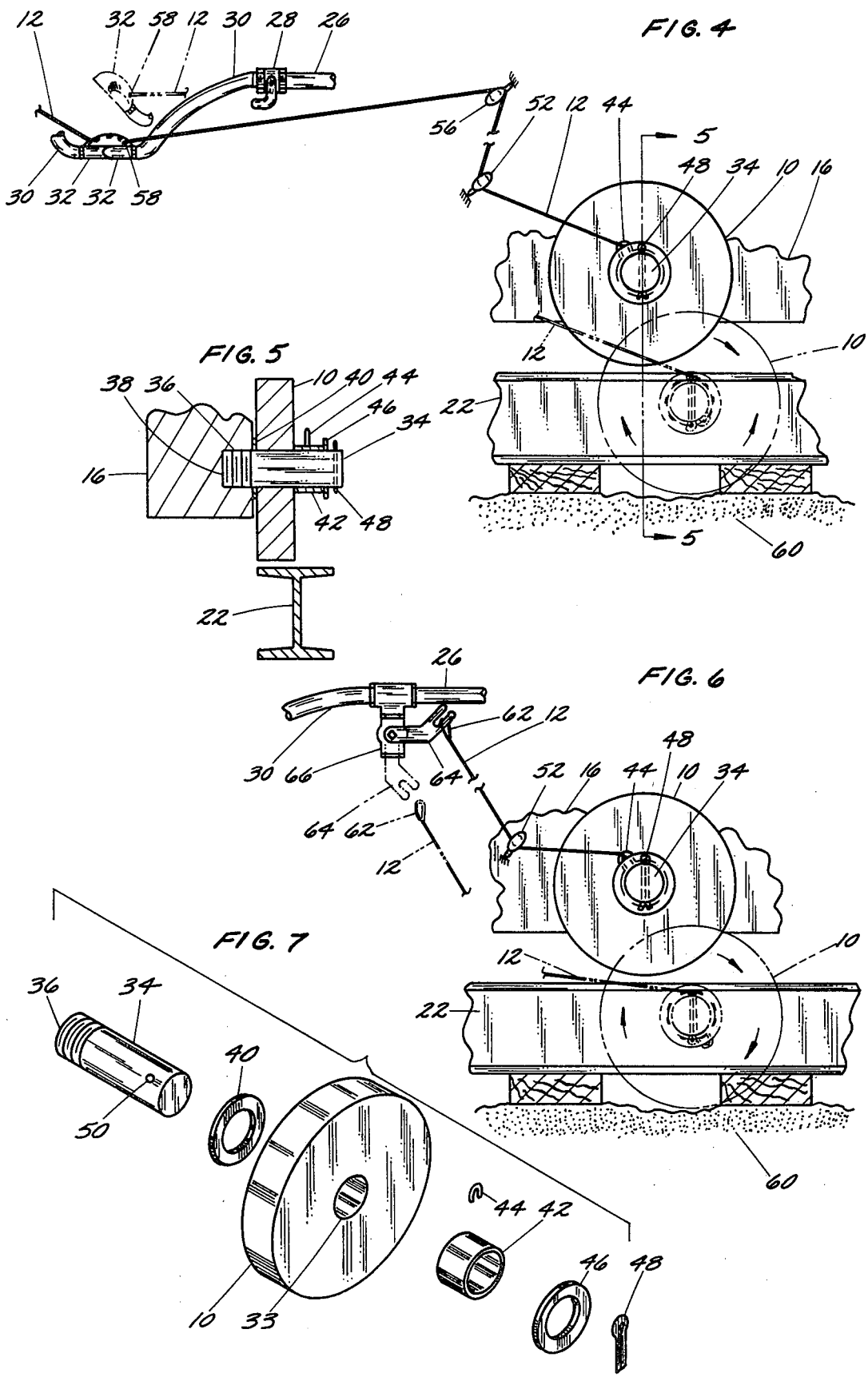

4,362,338

SAFETY DEVICE TO ACTUATE RAILROAD CAR AIR BRAKE

BACKGROUND OF THE INVENTION

This invention relates to a safety device for automatically actuating the air brake system for an entire train of cars when any one or more of the cars becomes derailed.

With the railroad industry long beset by the deteriorating condition of road beds and equipment and the lack of funds for the proper maintenance and repair of the same, the number of train derailments that occur each year has reached alarming proportions causing not only disruption of services to shippers and customers but tremendous financial losses in damage to equipment, road beds, loss of goods and injury or death to persons in many instances. I have observed that, particularly, in a long train of cars, the onset of derailment of a single car may not immediately become apparent to railroad operating personnel so that the brakes can be promptly actuated to stop the train and in such situations, before the train is finally stopped, it will have traveled a considerable distance during which time many additional cars will be pulled into derailment to materially add to the damages and losses which could have been avoided if the train had been stopped immediately upon derailment of the first car. Accordingly, it one of the important objects of the present invention to provide a safety device which will automatically actuate the air brakes on the entire train of cars at the time that any one of the cars becomes derailed and with such actuation being wholly independent of any action by railroad operating personnel.

Another object herein is to provide a safety device as characterized which is applied to the trucks at both ends of a railroad car and which acts automatically in response to the derailment of either of said trucks.

Further objects herein are to provide a safety device of the above class that is simple and economical to manufacture, can be installed either on new trucks or trucks presently in use and which is highly efficient for its intended use.

SUMMARY

A derail wheel on its own axle is attached to the truck frame between the wheels thereon both on the front and rear trucks and on the side nearest the train line so as to normally be spaced slightly above the rail but engageable with the ground in a derailment so as to be caused to rotate. A flexible steel cable is secured at one end to the axle of the derail wheel so as to be windable thereon when such wheel rotates and has its other end preferably connected to the nearest air hose coupling that is attached to a like coupling on an adjacent car. The winding up of the cable on the derail wheel assembly in a derailment acts to pull the air hose coupling loose from its coupling with the air hose on an adjacent car and the resulting breaking of the train line sets the brakes for all cars in the train. In a second embodiment, one end of the cable is detachably connected to an air valve placed in the air pipe of the train line whereby the winding up of the cable opens the valve to break the train line and is then automatically disengaged from such valve to avoid damage thereto.

BRIEF DESCRIPTION OF THE DRAWINGS

FIG. 4 is a side elevational schematic view of this invention taken from the line 4—4 of FIG. 3 and shown in broken lines when the derail wheel has acted to uncouple the air hoses to break the train line between two adjacent cars, FIG. 5 is a cross sectional view taken on the line 5—5 of FIG. 4, FIG. 6 is a view similar to FIG. 4 but showing a modified form of breaking the train line by use of an air valve in such line, and FIG. 7 is an exploded perspective view of the derail wheel forming a part of this invention.

DESCRIPTION OF THE PREFERRED EMBODIMENTS

Figure 1:
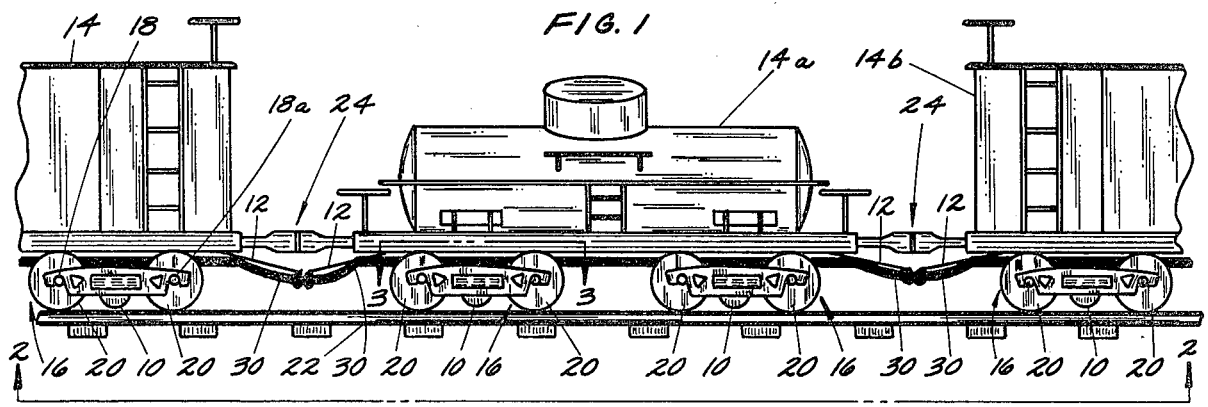
FIG. 1 is an elevational view of a railroad car shown coupled to fragmentary portions of other cars, front and rear respectively, representing a train of cars on a section of track and showing the cable element of this invention attached to the air brake hose coupling between the cars.

Referring to the drawings, the important features of this invention include what I have called a derail wheel 10 with a windable flexible steel cable 12 attached thereto as best seen in FIGS. 4, 6 and which will be later referred to in more detail. Wheel 10 with cable 12 is designed to automatically actuate the air brake on a train of railroad cars when any one of such cars becomes derailed and for purposes of more clearly illustrating the arrangement and operation of this invention, representative components of a train of railroad cars, for which no invention is claimed, are shown and generally described as follows.

Figure 2:
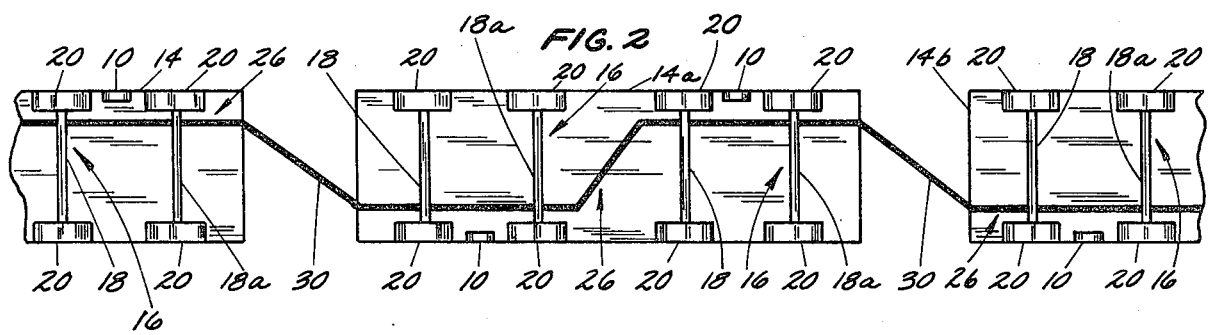
FIG. 2 is a plan view taken from the line 2—2 of FIG. 1 showing the conventional arrangement of the train line in the air brake system.
Figure 3:
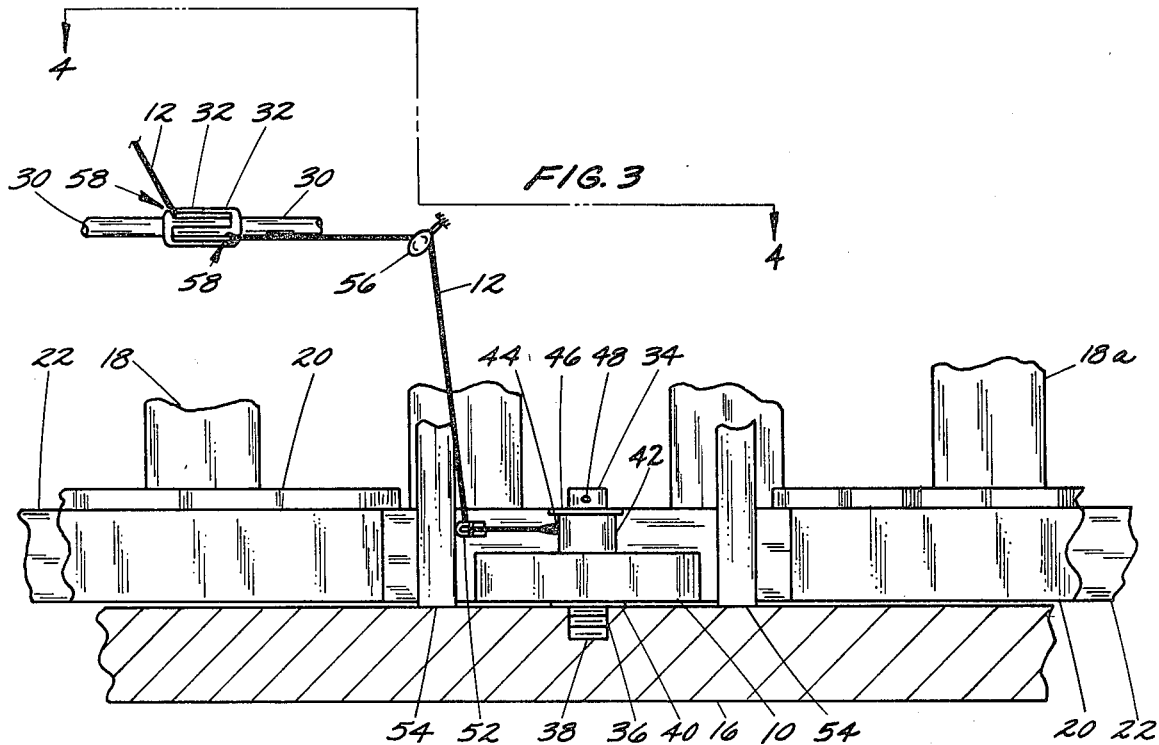
FIG. 3 is an enlarged plan view of this invention taken on the line 3—3 of FIG. 1 showing the cable element of this invention secured to conventionally connected air hose couplings between adjacent railroad cars and to the derail wheel assembly.

A train of railroad cars of an indeterminate number of cars is represented by cars 14, 14a, 14b, each supported at both forward and rear ends on a four wheel truck frame 16 that carries the parallel spaced axles 18, 18a with a wheel 20 secured to the end of each axle for travel over a rail bed 22 in a well known manner. Each car as seen in the center car 14a, is suitably coupled to an adjacent car, both front and rear, by a coupling means 24. As a part of the air brake system on a train as illustrated, a rigid air conduit 26, generally of steel and known as the train line, is suitably mounted to the underside of each car so as to extend over the length thereof and each end of the train line carries an angle cock or air valve 28 (FIG. 4) to which there is attached a flexible air hose 30. The free end of each hose 30 is provided with a coupling member 32 so that such members between adjacent cars can be detachably connected in a well known manner as best seen in FIG. 3. The train line 26 at the ends of each car are traditionally on the right hand side of the car as one faces such end so that between car ends, such line will cross the car from one side to the other as seen in FIG. 2. It will be understood that in the operation of the air brake system on a train of cars, which system per se is not a part of this invention and is thus not shown in detail, appropriate air pressure is maintained in the train line 26 and coupled hoses 32 and that the operation of the air brakes is effected by release of pressure in the train line in a well known manner by well known controls available to railroad operating personnel. The present invention, as will appear, is effective to automatically release the air in the train line 26 immediately upon derailment of any wheel 20 on any truck frame 16 to actuate the brakes on the entire train independently of any action by railroad personnel.

Derail wheel 10 is shown in an exploded view in FIG. 7 and assembled and mounted in FIG. 5. Such wheel has the axial bore 33, is preferably of steel and is approximately one foot in diameter although such material and size may be varied, if desired. Wheel 10 assembly includes a separate axle 34 which is threaded 36 on one end for mounting in a suitably threaded recess 38 on the inner side of each respective truck frame 16 closest to the train line 26. While I preferably use threads 36 as described, it will be understood that axle 34 can also be welded to frame 16. A washer 40 is placed on axle 34 adjacent frame 16 and wheel 10 is mounted on axle 34 adjacent such washer. On the side of wheel 10 opposite to washer 40, there is welded a sleeve 42 concentric with bore 33 and on which there is the U loop 44. A second washer 46 is placed on axle 34 against sleeve 42 and a cotter pin 48 extends through hole 50 in the free end of axle 34. Thus mounted, wheel 10 will normally be positioned slightly above the rail 22 (FIG. 5) so as to be free of contact therewith when all wheels 20 are in proper rail engagement for normal railroad car travel and such spacing of wheel 10 above the rail 22 may be on the order of one fourth to one half inch.

Cable 12, in the preferred embodiment, (FIGS. 3,4), is suitably secured at one end to loop 44 on sleeve 42 attached to wheel 10, then extends substantially pependicularly therefrom a short distance to and around a first pulley 52 secured on the brake beam 54, then upwardly to and around a second pulley 56 secured to the underside of the car and then to attachment with the nearest hose coupling 32. Normally, couplings 32 are provied with convenient eyes 58 to which cable 12 can be secured. It will be understood that a like cable arrangement extends from each wheel 10 to the nearest coupling 32 so that each of the connected coupling members 32 are separately connected to a different respective cable 12.

OPERATION

As seen in FIG. 2, a separate derail wheel 10 as described is associated with each front and rear truck frame 16 on each railroad car in the train and in normal travel will all wheels 20 on the rail 22, wheels 10 will be slightly elevated from such rail as seen in FIG. 1. However, whenever any wheel 20 on any truck frame 16 becomes derailed, wheel 10 on such frame will move downwardly sufficiently for contact with the ground 60 and thereby be caused to rotate so as to wind up cable 12 on sleeve 42 and pull one of the couplings 32 loose as seen in the broken line position in FIG. 4. Separation of couplings 32, of course, breaks the train line 26 so as to immediately actuate the air brakes on the entire train and this immediate actuation of the brakes at the onset of derailment substantially reduces potential damage to goods, equipment, road beds as well as disruption of services and even injury or death to persons since in long trains particularly, the onset of a derailment of a single truck frame may not immediately become apparent to those who normally apply the brakes and in such situations, the train will travel a considerable distance pulling additional cars into derailment before it it finally stopped.

With reference now to FIG. 6, I have shown a modified form of breaking the train line 26. Here, wheel 10 and cable 12 are mounted and arranged on a truck frame 16 as described above but instead of separating couplings 32 as described, cable 12 is passed around pulley 52 and has a bight 62 on its free end that is looped over one arm of an upwardly extending bifurcated lever 64 operably connected to a normally closed air valve 66 in the train line 26. By this arrangement, when wheel 10 rotates by ground engagement in derailment of an associated wheel 20, the winding up of cable 12 as described acts to move valve lever 64 to open position seen in broken lines in FIG. 6 to thereby break the train line 26 and actuate the air brakes. With lever 64 open, the bifurcated arms are extended downwardly so that cable 12 is pulled free therefrom to prevent any damage to such valve or the train line from further winding up of such cable. Accordingly, in view of the foregoing, it is thought a full understanding of the construction and operation of this invention will be had and the advantages of the same will be appreciated

I claim:

1. Apparatus to automatically actuate the air brake system on a train of railroad cars at the onset of a derailment, said train including a predetermined number of coupled cars each supported at respective front and rear ends on a wheeled truck frame for riding on a railbed and provided with a pressurized air brake system that includes a rigid train line on each car connected by a flexible hose with coupling to a like hose and coupling on each adjacent car, said apparatus comprising:

a wheel, means mounting said wheel to one said wheeled truck frames so that when said frame is in railbed engagement, said wheel is in a predetermined spaced relationship above said railbed, a flexible cable operably secured at one end to and windable on said wheel and operably connected at its other end to said train line, and derailment of said wheeled truck frame effective in moving said wheel into ground engagement to cause it to rotate and wind up said cable so as to break said train line and immediately actuate the air brake system on the train.

2. Apparatus to automatically actuate the air brake system on a train of railroad cars at the onset of a derailment, said train including a predetermined number of coupled cars each supported at respective front and rear ends on a wheeled truck frame for riding on a railbed and provided with a pressurized air brake system that includes a rigid train line on each car connected by a flexible hose with coupling to a like hose and coupling on each adjacent car, said apparatus comprising:

a wheel, means mounting said wheel to one of said wheeled truck frames so that when said frame is in railbed engagement, said wheel is in a predetermined spaced relationship above said railbed, a flexible cable operably secured at one end to and windable on said wheel and secured at its other end to the coupling on the nearest flexible hose, and derailment of said wheeled truck frame effective in moving said wheel into ground engagement to cause it to rotate and wind up said cable so as to pull the attached hose coupling free from the like coupling on an adjacent car to break the train line and immediately actuate the air brake system on the train.

3. Apparatus to automatically actuate the air brake system on a train of railroad cars at the onset of a derailment, said train including a predetermined number of coupled cars each supported at respective front and rear ends on a wheeled truck frame for riding on a railbed and provided with a pressurized air brake system that includes a rigid train line on each car connected by a flexible hose with coupling to a like hose and coupling on each adjacent car, said apparatus comprising:

a wheel, means mounting said wheel to one of said wheeled truck frames so that when said frame is in railbed engagement, said wheel is in a predetermined spaced relationship above said railbed, a normally closed air valve in said train line, a lever operably secured to said air valve for opening and closing the same, said lever in closed position disposed to extend on an upwardly inclined plane from said air valve and movable downwardly to effect the opening of said air valve, a flexible cable operably secured at one end to and windable on said wheel and releasably secured at its other end to said lever, derailment of said wheeled truck frame effective in moving said wheel into ground engagement to cause it to rotate and wind up said cable so as to move said lever downwardly whereby the opening of said air valve breaks the train line to actuate the air brake system, and in the downward position of said lever, said cable is pulled free therefrom by the winding up thereof.

4. Apparatus as defined in claims 1, 2 or 3 including a wheel and cable arrangement as defined applied to each wheeled truck frame on each railroad car so that the derailment of any truck frame on any railroad car will actuate the air brake system on said train.

5. Apparatus as defined in claims 1, 2 or 3 including:

a pulley secured to the underside of the railroad car, and said cable reeved through said pulley intermediate said wheel and said train line.

6. Apparatus as defined in claims 1, 2 or 3 wherein said wheel includes:

an axle suitably secured at one end to the inner side of said wheeled truck frame intermediate the wheels thereon, said wheel removably mounted on said axle, an axially extending sleeve secured to one side of said wheel, and one end of said cable secured to said sleeve and windable thereon in rotation of said wheel.

* * * * *